US007195544B2

(12) United States Patent
Prasad

(10) Patent No.: US 7,195,544 B2
(45) Date of Patent: Mar. 27, 2007

(54) CMP POROUS PAD WITH COMPONENT-FILLED PORES

(75) Inventor: Abaneshwar Prasad, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 90 days.

(21) Appl. No.: 10/807,064

(22) Filed: Mar. 23, 2004

(65) Prior Publication Data

US 2005/0215177 A1 Sep. 29, 2005

(51) Int. Cl.
*B24B 49/00* (2006.01)
(52) U.S. Cl. .......................................... 451/41; 451/285
(58) Field of Classification Search .................. 451/41, 451/28, 285–289, 526–534, 548, 488, 449
See application file for complete search history.

(56) References Cited

U.S. PATENT DOCUMENTS

| | | | |
|---|---|---|---|
| 3,769,093 A | 10/1973 | Jones | |
| 4,127,515 A | 11/1978 | MacRae et al. | |
| 4,138,228 A | 2/1979 | Hartfelt et al. | |
| 4,188,447 A | 2/1980 | Ehlenz | |
| 4,470,859 A | 9/1984 | Benezra et al. | |
| 4,581,287 A | 4/1986 | Smith et al. | |
| 5,104,421 A | 4/1992 | Takizawa et al. | |
| 5,164,348 A | 11/1992 | Wood | |
| 5,197,999 A | 3/1993 | Thomas | |
| 5,356,667 A | 10/1994 | Hench et al. | |
| 5,533,923 A * | 7/1996 | Shamouilian et al. | 451/41 |
| 5,578,362 A | 11/1996 | Reinhardt et al. | |
| 5,899,745 A | 5/1999 | Kim et al. | |
| 5,900,164 A | 5/1999 | Budinger et al. | |
| 5,908,478 A | 6/1999 | Wood | |
| 5,944,583 A | 8/1999 | Cruz et al. | |
| 5,972,792 A | 10/1999 | Hudson | |
| 6,022,264 A | 2/2000 | Cook et al. | |
| 6,099,394 A | 8/2000 | James et al. | |
| 6,190,238 B1 | 2/2001 | Tanaka et al. | |
| 6,270,844 B2 | 8/2001 | McClain et al. | |
| 6,521,284 B1 | 2/2003 | Parsons et al. | |
| 6,913,517 B2 * | 7/2005 | Prasad | 451/41 |
| 6,935,931 B2 * | 8/2005 | Prasad | 451/41 |
| 6,949,020 B2 * | 9/2005 | Xu et al. | 451/533 |
| 2001/0053658 A1 | 12/2001 | Budinger | |
| 2002/0090891 A1* | 7/2002 | Adefris et al. | 451/28 |
| 2002/0173225 A1 | 11/2002 | Wang | |
| 2002/0192268 A1 | 12/2002 | Alwattari et al. | |
| 2003/0060137 A1 | 3/2003 | Kramer | |
| 2003/0143330 A1 | 7/2003 | Loomis et al. | |
| 2005/0215177 A1* | 9/2005 | Prasad | 451/5 |

FOREIGN PATENT DOCUMENTS

WO    WO 94/04599 A1    3/1994

* cited by examiner

*Primary Examiner*—Lee D. Wilson
(74) *Attorney, Agent, or Firm*—Thomas Omholt; John Kilyk

(57) ABSTRACT

The invention provides a polishing pad comprising a polymeric material having pores and a component that is disposed within the pores, as well as a method of polishing a workpiece with the aforesaid polishing pad, and a method for producing the aforesaid polishing pad.

32 Claims, 2 Drawing Sheets

CMP POROUS PAD WITH COMPONENT-FILLED PORES

FIELD OF THE INVENTION

This invention pertains to a polishing pad suitable for use in chemical-mechanical polishing systems.

BACKGROUND OF THE INVENTION

Chemical-mechanical polishing ("CMP") processes are used in the manufacturing of microelectronic devices to form flat surfaces on semiconductor wafers, field emission displays, and many other microelectronic workpieces. For example, the manufacture of semiconductor devices generally involves the formation of various process layers, selective removal or patterning of portions of those layers, and deposition of yet additional process layers above the surface of a semiconducting workpiece to form a semiconductor wafer. The process layers can include, by way of example, insulation layers, gate oxide layers, conductive layers, and layers of metal or glass, etc. It is generally desirable in certain steps of the wafer process that the uppermost surface of the process layers be planar, i.e., flat, for the deposition of subsequent layers. CMP is used to planarize process layers wherein a deposited material, such as a conductive or insulating material, is polished to planarize the wafer for subsequent process steps.

In a typical CMP process, a wafer is mounted upside down on a carrier in a CMP tool. A force pushes the carrier and the wafer downward toward a polishing pad. The carrier and the wafer are rotated above the rotating polishing pad on the CMP tool's polishing table. A polishing composition (also referred to as a polishing slurry) generally is introduced between the rotating wafer and the rotating polishing pad during the polishing process. The polishing composition typically contains a chemical that interacts with or dissolves portions of the uppermost wafer layer(s) and an abrasive material that physically removes portions of the layer(s). The wafer and the polishing pad can be rotated in the same direction or in opposite directions, whichever is desirable for the particular polishing process being carried out. The carrier also can oscillate across the polishing pad on the polishing table.

Polishing pads used in chemical-mechanical polishing processes are manufactured using both soft and rigid pad materials, which include polymer-impregnated fabrics, microporous films, cellular polymer foams, non-porous polymer sheets, and sintered thermoplastic particles. A pad containing a polyurethane resin impregnated into a polyester non-woven fabric is illustrative of a polymer-impregnated fabric polishing pad. Microporous polishing pads include microporous urethane films coated onto a base material, which is often an impregnated fabric pad. These polishing pads are closed cell, porous films. Cellular polymer foam polishing pads contain a closed cell structure that is randomly and uniformly distributed in all three dimensions. Non-porous polymer sheet polishing pads include a polishing surface made from solid polymer sheets, which have no intrinsic ability to transport slurry particles (see, for example, U.S. Pat. No. 5,489,233). These solid polishing pads are externally modified with large and/or small grooves that are cut into the surface of the pad purportedly to provide channels for the passage of slurry during chemical-mechanical polishing. Such a non-porous polymer polishing pad is disclosed in U.S. Pat. No. 6,203,407, wherein the polishing surface of the polishing pad comprises grooves that are oriented in a way that purportedly improves selectivity in the chemical-mechanical polishing. Sintered polishing pads comprising a porous open-celled structure can be prepared from thermoplastic polymer resins. For example, U.S. Pat. Nos. 6,062,968 and 6,126,532 disclose polishing pads with open-celled, microporous substrates, produced by sintering thermoplastic resins.

Although several of the above-described polishing pads are suitable for their intended purpose, a need remains for other polishing pads that provide effective planarization, particularly in workpieces polished by chemical-mechanical polishing. There also is a need for polishing pads with improved polishing uniformity that minimize the number of defects, such as edge-on effects and dishing, produced during workpiece polishing.

The invention provides such a polishing pad. These and other advantages of the invention, as well as additional inventive features, will be apparent from the description of the invention provided herein.

BRIEF SUMMARY OF THE INVENTION

The invention provides a polishing pad comprising a polymeric material having pores and a component disposed within the pores. The invention further provides a method of polishing a workpiece comprising (i) providing a workpiece to be polished, (ii) contacting the workpiece with a chemical-mechanical polishing system comprising the polishing pad of the invention, and (iii) abrading at least a portion of the surface of the workpiece with the polishing system to polish the workpiece. The invention also provides a method for producing the polishing pad comprising (i) providing a porous polymeric material having gas-filled pores, (ii) subjecting said material to a pressure differential, (iii) contacting at least one surface of the material with a medium comprising the component, (iv) allowing the medium to permeate at least a portion of the pores, and (v) forming the polymeric material comprising component-filled pores into a polishing pad.

DETAILED DESCRIPTION OF THE INVENTION

Figure 1:
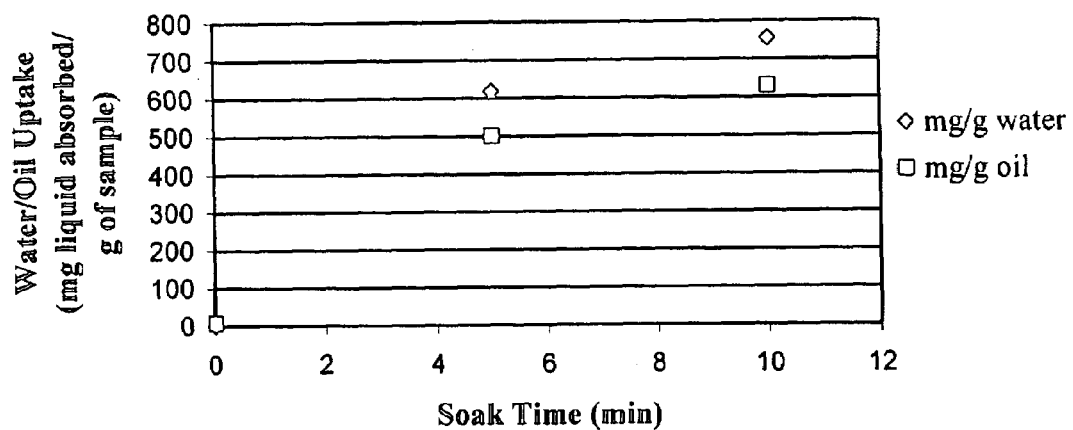
FIG. 1 is a graph of water and silicon oil uptake into a pad with closed-cell pores versus soak time at a fixed applied vacuum of 0.67 atm.
Figure 2:
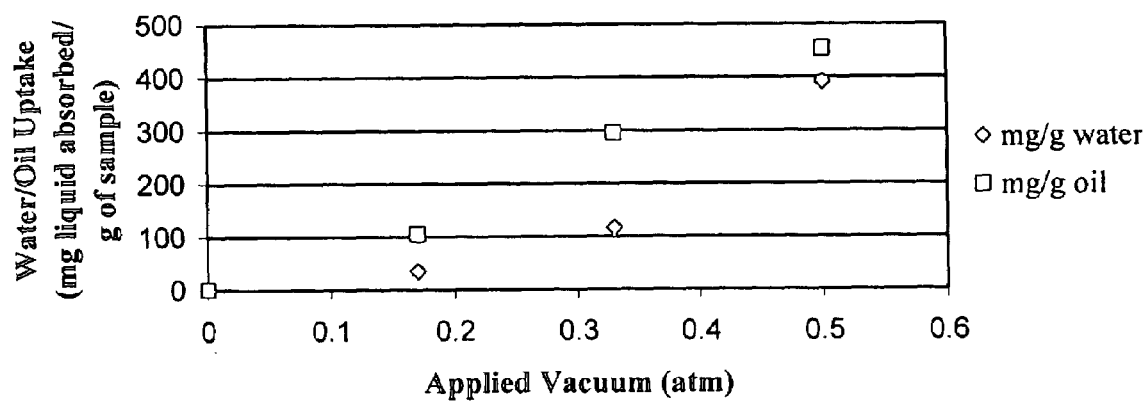
FIG. 2 is a graph of water and silicon oil uptake into a pad with closed-cell pores versus applied vacuum at a fixed soak time of 2 minutes.
Figure 3:
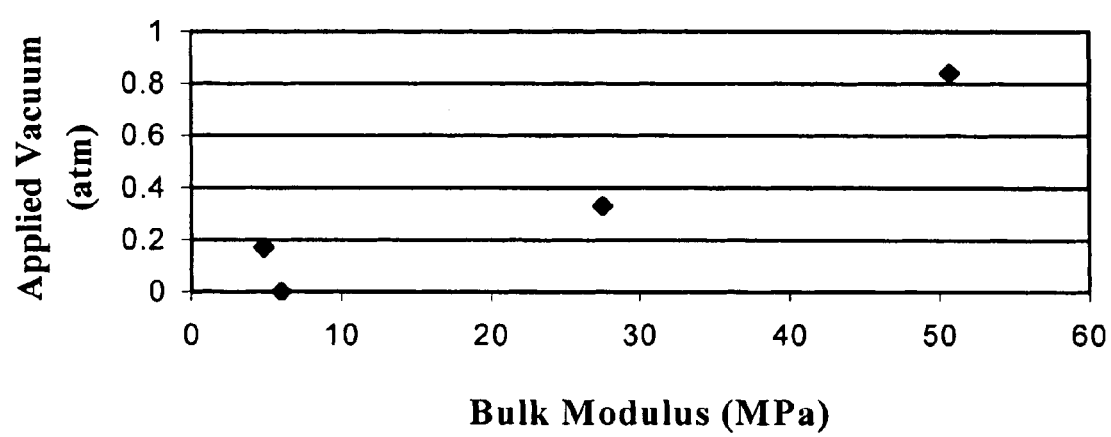
FIG. 3 is a graph of the applied vacuum versus bulk modulus for a pad with closed-cell pores after a fixed soak time of 2 minutes in water.

The invention provides a chemical-mechanical polishing pad comprising a polymeric material and a component selected from a liquid, a solid, or a mixture thereof, wherein the polymeric material has pores and the component is disposed within the pores. The term "pore" describes void spaces within the polymeric material matrix that are at least partially bounded solely by the polymeric material. In addition, the term "pore" describes both open-celled pores and closed-celled pores.

The polishing pad of the invention comprises, consists essentially of, or consists of the polymeric material and the component. The polymeric material can be any suitable polymeric material, typically a thermoplastic polymer or a thermoset polymer. Preferably the polymeric material is a thermoplastic polymer or a thermoset polymer selected from the group consisting of polyurethanes, polyolefins, polyvinylalcohols, polyvinylacetates, polycarbonates, polyacrylic acids, polyacrylamides, polyethylenes, polypropylenes, nylons, fluorocarbons, polyesters, polyethers, polyamides, polyimides, polytetrafluoroethylenes, polyetheretherketones, copolymers thereof, and mixtures thereof. Preferably, the thermoplastic polymer or the thermoset polymer is selected from the group consisting of polyurethanes and polyolefins.

The component can be any suitable liquid, solid, or mixture thereof. The component can be any suitable liquid, such as water, an organic solvent (e.g., a nonaromatic hydrocarbon, an aromatic hydrocarbon such as m-pyrol mesitylene, an alcohol, an organic acid, a halogen-containing hydrocarbon, a halogen-containing organic acid, a thiol, or an ether), an inorganic acid (e.g., hydrochloric acid, sulfuric acid, phosphoric acid, or nitric acid), silicon oil, or any combination or mixture thereof. For example, the liquid can be a solution comprising a solvent and a solute. The solvent can be any suitable liquid or mixture of liquids, such as those described above, and the solute can be any substance (i.e., solid, liquid, or gas) that is at least partially soluble in or miscible with the solvent in a range of temperatures defined by the melting point and the boiling point of the solvent. For example, the solution can comprise at least two solution phases at a temperature of about 40° C. or less, or the solution can comprise one solution phase at a temperature of about 40° C. or more. In addition, the solution can be a thermoreversible gel. The thermoreversible gel has the property of forming a gel within a certain temperature range (i.e., the gelation temperature range), and the thermoreversible gel can be a liquid or a solid when the temperature is outside the gelation temperature range. The thermoreversible gel can comprise, for example, polyethylene and xylene.

The component also can be any suitable solid or mixture of solids. The solid can be a particle, and the solid particle can have any suitable average particle diameter. For example, the average particle diameter can be about 5000 μm or less (e.g., about 2500 μm or less, about 1000 μm or less, or about 500 μm or less). Alternatively, the average particle diameter can be about 1 μm or more (e.g., about 100 μm or more, about 250 μm or more, or about 500 μm or more). In particular, the solid can consist of nanoparticles having a largest diameter of about 1 μm or less (e.g., about 0.8 μm or less, about 0.5 μm or less, or about 0.1 μm or less). In addition, the solid can be conductive. The solid also can be an abrasive particle, such as a metal oxide (e.g., alumina, silica, titania, ceria, zirconia, germania, magnesia, co-formed products thereof, and combinations thereof).

The component also can be any suitable mixture of liquid and solid. For example, the component can be a slurry, a dispersion, a colloid, or a suspension.

The polishing pad of the invention comprises a polymeric material having pores. The pores can comprise open-celled pores, closed-celled pores, or a combination thereof. For example, the pores can comprise about 70% or more (e.g., about 80% or more or about 90% or more) open-celled pores. The pores can also comprise about 70% or more (e.g., about 80% or more or about 90% or more) closed-celled pores. The pores can have any suitable void volume (i.e., the volume of the pores). For example, the void volume can be about 75% or less (e.g., about 65% or less, about 55% or less, or about 45% or less).

The component is disposed within the pores and can be distributed in any suitable arrangement within the pores. The component can be disposed in about 70% or more (e.g., about 80% or more, about 85% or more, about 90% or more, or about 95% or more) of the void volume of the pores in the polymeric material. In another embodiment, the polishing pad of the invention can comprise a component uniformly distributed within the pores in the polymeric material.

Alternatively, the polishing pad of the invention can comprise a component distributed within the pores in a first region of the polishing pad. The polishing pad comprises a first surface, an opposing second surface, and a thickness between the surfaces. A first region of the polishing pad can be defined by the first surface of the polishing pad and by 50% or less (e.g., 40% or less, 20% or less, 10% or less, or 5% or less) of the thickness of the polishing pad. A second region of the polishing pad can be defined by the opposing second surface of the polishing pad and by 50% or less (e.g., 40% or less, 20% or less, 10% or less, or 5% or less) of the thickness of the polishing pad. The first region and the second region can comprise pores and can have any suitable volume. For example, the first region, the second region, or both can have a volume of about 50 $cm^3$ or less (e.g., about 40 $cm^3$ or less, about 30 $cm^3$ or less, about 20 $cm^3$ or less, about 10 $cm^3$ or less, or about 5 $cm^3$ or less). The component can be disposed within about 70% or more (e.g., about 80% or more, about 85% or more, about 90% or more, or about 95% or more) of the void volume of the pores in the first region, the second region, or both.

In another embodiment, the component can be disposed within about 70% or more (e.g., about 80% or more, about 85% or more, about 90% or more, or about 95% or more) of the void volume of the pores located within about 1000 μm or less (e.g., about 750 μm or less, about 500 μm or less, about 250 μm or less, or about 100 μm or less) of the surface of the polishing pad.

The polishing pad of the invention can have any suitable pore density. For example, the pore density can be about 10 pores/$cm^3$ or greater (e.g., about 15 pores/$cm^3$ or greater, about 20 pores/$cm^3$ or greater, or about 25 pores/$cm^3$ or greater). The polishing pad of the invention can also have any suitable average pore diameter. For example, the average pore diameter can be about 0.1 μm or more (e.g., about 1 μm or more, about 5 μm or more, about 10 μm or more). Alternatively, the average pore diameter can be about 5000 μm or less (e.g., about 2500 μm or less, about 1000 μm or less, or about 500 μm or less).

The polishing pad of the invention can have any suitable density. For example, the density can be about 1 g/$cm^3$ or less (e.g., about 0.8 g/$cm^3$ or less or about 0.5 g/$cm^3$ or less). Alternatively, the polishing pad of the invention can have a density that is about 75% or less of the theoretical density of the polymeric material (e.g., about 65% or less, about 55% or less, or about 45% or less).

The polishing pad of the invention can be used alone, or optionally can be mated to another polishing pad. When two polishing pads are mated, the polishing pad intended to contact the workpiece to be polished serves as the polishing layer, while the other polishing pad serves as the subpad. For example, the polishing pad of the invention can be a subpad that is mated to a conventional polishing pad having a polishing surface, wherein the conventional polishing pad serves as the polishing layer. Alternatively, the polishing pad of the invention can comprise a polishing surface, and serve as the polishing layer, and can be mated to a conventional polishing pad that serves as a subpad. Suitable polishing pads for use as the polishing layer in combination with a polishing pad of the invention include solid or porous polyurethane pads, many of which are well known in the art. Suitable subpads include polyurethane foam subpads, impregnated felt subpads, microporous polyurethane subpads, or sintered urethane subpads. The polishing layer and/or the subpad optionally comprises grooves, channels, hollow sections, windows, apertures, and the like. The subpad can be affixed to the polishing layer by any suitable means. For example, the polishing layer and subpad can be affixed through adhesives or can be attached via welding or similar technique. Typically, an intermediate backing layer such as a polyethyleneterephthalate film is disposed between the polishing layer and the subpad. When the polishing pad of the invention is mated to a conventional polishing pad, the composite polishing pad also is considered a polishing pad of the invention.

The polishing layer can be modified by buffing or conditioning, such as by moving the pad against an abrasive surface. The preferred abrasive surface for conditioning is a disk which is preferably metal and which is preferably embedded with diamonds of a size in the range of 1 μm to 0.5 mm. Optionally, conditioning can be conducted in the presence of a conditioning fluid, preferably a water-based fluid containing abrasive particles.

The polishing layer optionally further comprises grooves, channels, and/or perforations. Such features can facilitate the lateral transport of a polishing composition across the surface of the polishing layer. The grooves, channels, and/or perforations can be in any suitable pattern and can have any suitable depth and width. The polishing pad can have two or more different groove patterns, for example a combination of large grooves and small grooves as described in U.S. Pat. No. 5,489,233. The grooves can be in the form of linear grooves, slanted grooves, concentric grooves, spiral or circular grooves, or XY crosshatch pattern, and can be continuous or non-continuous in connectivity.

The polishing pad of the invention optionally further comprises one or more apertures, transparent regions, or translucent regions (e.g., windows as described in U.S. Pat. No. 5,893,796). The inclusion of such apertures or translucent regions (i.e., optically transmissive regions) is desirable when the polishing pad substrate is to be used in conjunction with an in situ CMP process monitoring technique. The aperture can have any suitable shape and may be used in combination with drainage channels for minimizing or eliminating excess polishing composition on the polishing surface. The optically transmissive region or window can be any suitable window, many of which are known in the art. For example, the optically transmissive region can comprise a glass or polymer-based plug that is inserted in an aperture of the polishing pad or may comprise the same polymeric material used in the remainder of the polishing pad. Typically, the optically transmissive regions have a light transmittance of about 10% or more (e.g., about 20% or more, or about 30% or more) at one or more wavelengths between from about 190 nm to about 10,000 nm (e.g., from about 190 nm to about 3500 nm, from about 200 nm to about 1000 nm, or from about 200 nm to about 780 nm).

The optically transmissive region can have any suitable structure (e.g., crystallinity), density, and porosity. For example, the optically transmissive region can be solid or porous (e.g., microporous or nanoporous having an average pore size of less than 1 μm). Preferably, the optically transmissive region is solid or is nearly solid (e.g., has a void volume of about 3% or less). The optically transmissive region optionally further comprises particles selected from polymer particles, inorganic particles, and combinations thereof. The optically transmissive region optionally contains pores.

The optically transmissive region optionally further comprises a dye, which enables the polishing pad material to selectively transmit light of a particular wavelength(s). The dye acts to filter out undesired wavelengths of light (e.g., background light) and thus improves the signal to noise ratio of detection. The optically transmissive region can comprise any suitable dye or may comprise a combination of dyes. Suitable dyes include polymethine dyes, di-and tri-arylmethine dyes, aza analogues of diarylmethine dyes, aza (18) annulene dyes, natural dyes, nitro dyes, nitroso dyes, azo dyes, anthraquinone dyes, sulfur dyes, and the like. Desirably, the transmission spectrum of the dye matches or overlaps with the wavelength of light used for in situ endpoint detection. For example, when the light source for the endpoint detection (EPD) system is a HeNe laser, which produces visible light having a wavelength of about 633 nm, the dye preferably is a red dye, which is capable of transmitting light having a wavelength of about 633 nm.

The polishing pad of the invention optionally contains particles, e.g., particles that are incorporated into the polymeric material. The particles can be abrasive particles, polymer particles, composite particles (e.g., encapsulated particles), organic particles, inorganic particles, clarifying particles, water-soluble particles, and mixtures thereof. The polymer particles, composite particles, organic particles, inorganic particles, clarifying particles, and water-soluble particles also may be abrasive, or may be non-abrasive, in nature.

The abrasive particles can be of any suitable material. For example, the abrasive particles can comprise a metal oxide, such as a metal oxide selected from the group consisting of alumina, silica, titania, ceria, zirconia, germania, magnesia, co-formed products thereof, and combinations thereof, or a silicon carbide, boron nitride, diamond, garnet, or ceramic abrasive material. The abrasive particles can be hybrids of metal oxides and ceramics or hybrids of inorganic and organic materials. The particles also can be polymer particles many of which are described in U.S. Pat. No. 5,314,512, such as polystyrene particles, polymethylmethacrylate particles, liquid crystalline polymers (LCP), polyetheretherketones (PEEK's), particulate thermoplastic polymers (e.g., particulate thermoplastic polyurethane), particulate cross-linked polymers (e.g., particulate cross-linked polyurethane or polyepoxide), or a combination thereof. If the porous re-entrant material comprises a polymer resin, then the polymer particle desirably has a melting point that is higher than the melting point of the polymer resin of the porous foam. The composite particles can be any suitable particle containing a core and an outer coating. For example, the composite particles can contain a solid core (e.g., a metal oxide, metal, ceramic, or polymer) and a polymeric shell (e.g., polyurethane, nylon, or polyethylene). The clarifying particles can be phyllosilicates, (e.g., micas such as fluorinated micas, and clays such as talc, kaolinite, montmorillonite, hectorite), glass fibers, glass beads, diamond particles, carbon fibers, and the like.

The polishing pad of the invention can be prepared in any suitable manner. A preferred method for producing the polishing pad of the invention comprises: (i) providing a polymeric material comprising gas-filled pores, (ii) subjecting the polymeric material to a pressure differential, (iii) contacting at least one surface of the polymeric material with a medium comprising a component selected from a liquid, a solid, or a mixture thereof, (iv) allowing the medium comprising the component to permeate at least a portion of the pores of the polymeric material, and (v) forming the polymeric material comprising component-filled pores into a chemical-mechanical polishing pad.

The pressure differential is a pressure that is greater than or less than atmospheric pressure. For example, the pressure differential can be a pressure greater than about 1 atm (e.g., about 2 atm or more, about 5 atm or more, about 10 atm or more, or about 20 atm or more). In another embodiment, the pressure differential can be a pressure less than about 1 atm (e.g., about 0.5 atm or less, about 0.2 atm or less, about 0.1 atm or less, about 0.05 atm or less, or about 0.005 atm or less). The polymeric material can be contacted with the medium comprising the component prior to subjecting the polymeric material to a pressure differential or after subjecting the polymeric material to a pressure differential.

The medium comprising the component is distributed in the pores of the polymeric material by the pressure differential. For example, the medium comprising the component can be uniformly distributed within the pores of the polymeric material by the pressure differential.

The polymeric material comprising pores containing the component (i.e., the component-filled pores) can be formed into a polishing pad, such as a polishing pad for use in chemical-mechanical polishing systems. The polishing pad can have any suitable shape (e.g., circular or linear). In addition, the polymeric material comprising component-filled pores can also be modified prior to or after being formed into a polishing pad. For example, the solvent can be dried to leave solute particles inside the pores, and the polymeric material comprising the component-filled pores can be compressed to form a polymeric sheet by molding at a temperature between the glass transition temperature (Tg) and the melting point temperature (Tm) of the polymeric material.

The polishing pad of the invention is particularly suited for use in conjunction with a chemical-mechanical polishing (CMP) apparatus. Typically, the apparatus comprises (a) a platen, which, when in use, is in motion and has a velocity that results from orbital, linear, or circular motion, (b) a polishing pad of the invention in contact with the platen and moving with the platen when in motion, and (c) a carrier that holds a workpiece to be polished by contacting and moving relative to the surface of the polishing pad intended to contact a workpiece to be polished. The polishing of the workpiece takes place by the workpiece being placed in contact with the polishing pad and then the polishing pad moving relative to the workpiece, typically with a polishing composition therebetween, so as to abrade at least a portion of the workpiece to polish the workpiece. The CMP apparatus can be any suitable CMP apparatus, many of which are known in the art. The polishing pad of the invention also can be used with linear polishing tools.

Suitable workpieces that can be polished with the polishing pad of the invention include memory storage devices, glass substrates, memory or rigid disks, metals (e.g., noble metals), magnetic heads, inter-layer dielectric (ILD) layers, polymeric films (e.g., organic polymers), low and high dielectric constant films, ferroelectrics, micro-electro-mechanical systems (MEMS), semiconductor wafers, field emission displays, and other microelectronic workpieces, especially microelectronic workpieces comprising insulating layers (e.g., metal oxide, silicon nitride, or low dielectric materials) and/or metal-containing layers (e.g., copper, tantalum, aluminum, nickel, titanium, platinum, ruthenium, rhodium, iridium, silver, gold, alloys thereof, and mixtures thereof). The term "memory or rigid disk" refers to any magnetic disk, hard disk, rigid disk, or memory disk for retaining information in electromagnetic form. Memory or rigid disks typically have a surface that comprises nickel-phosphorus, but the surface can comprise any other suitable material. Suitable metal oxide insulating layers include, for example, alumina, silica, titania, ceria, zirconia, germania, magnesia, and combinations thereof. In addition, the workpiece can comprise, consist essentially of, or consist of any suitable metal composite. Suitable metal composites include, for example, metal nitrides (e.g., tantalum nitride, titanium nitride, and tungsten nitride), metal carbides (e.g., silicon carbide and tungsten carbide), metal silicides (e.g., tungsten silicide and titanium silicide), nickel-phosphorus, alumino-borosilicate, borosilicate glass, phosphosilicate glass (PSG), borophosphosilicate glass (BPSG), silicon/germanium alloys, and silicon/germanium/carbon alloys. The workpiece also can comprise, consist essentially of, or consist of any suitable semiconductor base material. Suitable semiconductor base materials include monocrystalline silicon, polycrystalline silicon, amorphous silicon, silicon-on-insulator, and gallium arsenide. Preferably, the workpiece comprises a metal layer, more preferably a metal layer selected from the group consisting of copper, tungsten, tantalum, platinum, aluminum, and combinations thereof. Even more preferably, the metal layer comprises copper.

The polishing composition of the polishing system that can be used with the polishing pad of the invention typically comprises a liquid carrier (e.g., water) and optionally one or more additives selected from the group consisting of abrasives (e.g., alumina, silica, titania, ceria, zirconia, germania, magnesia, and combinations thereof), oxidizers (e.g., hydrogen peroxide and ammonium persulfate), corrosion inhibitors (e.g., benzotriazole), film-forming agents (e.g., polyacrylic acid and polystyrenesulfonic acid), complexing agents (e.g., mono-, di-, and poly-carboxylic acids, phosphonic acids, and sulfonic acids), pH adjustors (e.g., hydrochloric acid, sulfuric acid, phosphoric acid, sodium hydroxide, potassium hydroxide, and ammonium hydroxide), buffering agents (e.g., phosphate buffers, acetate buffers, and sulfate buffers), surfactants (e.g., nonionic surfactants), salts thereof, and combinations thereof. The selection of the components of the polishing composition depends in part on the type of workpiece being polished.

Desirably, the CMP apparatus further comprises an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. No. 5,196,353, U.S. Pat. No. 5,433,651, U.S. Pat. No. 5,609,511, U.S. Pat. No. 5,643,046, U.S. Pat. No. 5,658,183, U.S. Pat. No. 5,730,642, U.S. Pat. No. 5,838,447, U.S. Pat. No. 5,872,633, U.S. Pat. No. 5,893,796, U.S. Pat. No. 5,949,927, and U.S. Pat. No. 5,964,643. Desirably, the inspection or monitoring of the progress of the polishing process with respect to a workpiece being polished enables the determination of the polishing end-point, i.e., the determination of when to terminate the polishing process with respect to a particular workpiece.

The following examples further illustrate the invention but, of course, should not be construed as in any way limiting its scope.

EXAMPLES 1–4

These examples demonstrate the uptake of a component into a polymeric foam, specifically carbon black into a polyolefin foam under various conditions. In each of these examples, a foam sample was placed in a medium containing the component and then subjected to a pressure of 0.5 atm in a vacuum chamber. The details of each of these examples are set forth in Table 1.

TABLE 1

| Example | Foam Type | Impregnation Method | Component in Medium | Sample % wt. Gain |
|---------|-----------|---------------------|---------------------|-------------------|
| 1 | Closed-cell | Continuous vacuum, 22° C. for 1 hr | 5% carbon black in m-pyrrol | 7.9% |
| 2 | Closed-cell | Vacuum on/off, 50° C., 1 hr | 0.8% carbon black in mesitylene | 4.4% |
| 3 | Open-cell | Vacuum on/off, 22° C., 1 hr, one side of foam submerged in liquid medium | 0.8% carbon black in mesitylene | 22.9% |
| 4 | Open-cell | Vacuum on/off, 22° C., 1 hr, foam completely submerged in liquid medium | 0.8% carbon black in mesitylene | 116% |

The percent weight gained (i.e., sample % wt. gain) for each sample is set forth in Table 1 and indicates the extent of uptake of the carbon black into the pores of the foam. The results of these examples demonstrate that significant amount of a component, such as carbon black, can be distributed in the pores of a polymeric foam.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A chemical-mechanical polishing pad comprising a polymeric material and a component selected from a liquid, a solid, or a mixture thereof, wherein the polymeric material has pores and the component is disposed within about 70% or more of the pores located within about 1000 μm or less of the surface of the polishing pad.

2. The polishing pad of claim 1, wherein the polymeric material is a thermoplastic polymer or a thermoset polymer.

3. The polishing pad of claim 2, wherein the thermoplastic polymer or the thermoset polymer is selected from the group consisting of polyurethaxies, polyolefins, polyvinylalcohols, polyvinylacetates, polycarbonates, polyacrylic acids, polyacrylamides, polyethylenes, polypropylenes, nylons, fluorocarbons, polyesters, polyethers, polyamides, polyimides, polytetrafluoroethylenes, polyetheretherketones, copolymers thereof, and mixtures thereof.

4. The polishing pad of claim 3, wherein the thermoplastic polymer or the thermoset polymer is selected from the group consisting of polyurethanes and polyolefins.

5. The polishing pad of claim 1, wherein the component is a liquid.

6. The polishing pad of claim 5, wherein the liquid is a solution comprising a solvent and a solute.

7. The polishing pad of claim 6, wherein the solution comprises at least two solution phases.

8. The polishing pad of claim 7, wherein the solution comprises at least two solution phases at about 40° C. or less.

9. The polishing pad of claim 6, wherein the solution comprises one solution phase.

10. The polishing pad of claim 9, wherein the solution comprises one solution phase at about 40° C. or less.

11. The polishing pad of claim 6, wherein the solution is a thermoreversible gel.

12. The polishing pad of claim 11, wherein the thermoreversible gel comprises polyethylene and xylene.

13. The polishing pad of claim 1, wherein the component is a solid.

14. The polishing pad of claim 13, wherein the solid consists essentially of particles having a largest diameter of about 1 μm or less.

15. The polishing pad of claim 13, wherein the solid is conductive.

16. The polishing pad of claim 13, wherein the solid consists essentially of abrasive particles.

17. The polishing pad of claim 16, wherein the abrasive particles comprise metal oxide selected from the group consisting of alumina, silica, titania, ceria, zirconia, germania, magnesia, co-formed products thereof, and combinations thereof.

18. The polishing pad of claim 1, wherein the polishing pad has a density of about 2 g/cm$^3$ or less.

19. The polishing pad of claim 1, wherein the polishing pad has a void volume of about 75% or less.

20. The polishing pad of claim 1, wherein the polishing pad has a pore density of about 10 pores/cm$^3$ or greater.

21. The polishing pad of claim 1, wherein the average pore diameter is from about 0.1 μm to about 5000 μm.

22. The polishing pad of claim 1, wherein the polishing pad further comprises a polishing surface comprising grooves.

23. The polishing pad of claim 1, wherein the polishing pad further comprises an optically transmissive region.

24. The polishing pad of claim 23, wherein the optically transmissive region has a light transmission of at least 10% at one or more wavelengths between from about 190 nm to about 3500 nm.

25. The polishing pad of claim 1, wherein the polishing pad further comprises abrasive particles.

26. The polishing pad of claim 25, wherein the abrasive particles comprise metal oxide selected from the group consisting of alumina, silica, titania, ceria, zirconia, gennania, magnesia, co-formed products thereof, and combinations thereof.

27. The polishing pad of claim 1, wherein the pores comprise about 70% or more open-celled pores.

28. The polishing pad of claim 1, wherein the pores comprises about 70% or more closed-celled pores.

29. The polishing pad of claim 1, wherein the polishing pad has a fast surface, an opposing second surface, and a thickness between the first and second surfaces, wherein at least some of the pores are located within a first region of the polishing pad defined by the first surface and about 10% or less of the thickness of the polishing pad, and wherein the component is disposed within about 70% or more of the void volume of the pores within the first region.

30. The polishing pad of claim 29, wherein at least some of the pores are located within a second region of the polishing pad defined by the second surface and about 10% or less of the thickness of the polishing pad and wherein the component is disposed within about 70% or more of the void volume of the pores within the second region.

31. The polishing pad of claim 29, wherein the first region has a volume of about 10 $cm^3$ or less.

32. The polishing pad of claim 30, wherein the second region has a volume of about 10 $cm^3$ or less.

* * * * *